(12) United States Patent
Lipp

(10) Patent No.: US 10,676,377 B2
(45) Date of Patent: Jun. 9, 2020

(54) SELECTIVE SEPARATION PROCESS

(71) Applicant: BATEMAN ADVANCED TECHNOLOGIES LTD., Yokneam (IL)

(72) Inventor: Jonathan Lipp, Givat Avni (IL)

(73) Assignee: TENOVA ADVANCED TECHNOLOGIES LTD., Yokneam (IL)

( * ) Notice: Subject to any disclaimer, the term of this patent is extended or adjusted under 35 U.S.C. 154(b) by 44 days.

(21) Appl. No.: 15/310,773

(22) PCT Filed: May 18, 2015

(86) PCT No.: PCT/IB2015/053642
§ 371 (c)(1),
(2) Date: Nov. 13, 2016

(87) PCT Pub. No.: WO2015/177705
PCT Pub. Date: Nov. 26, 2015

(65) Prior Publication Data
US 2017/0081217 A1 Mar. 23, 2017

(30) Foreign Application Priority Data
May 19, 2014 (GB) .................................. 1408885.0

(51) Int. Cl.
*C02F 1/44* (2006.01)
*B01D 61/12* (2006.01)
(Continued)

(52) U.S. Cl.
CPC ............ *C02F 1/441* (2013.01); *B01D 61/025* (2013.01); *B01D 61/12* (2013.01);
(Continued)

(58) Field of Classification Search
CPC combination set(s) only.
See application file for complete search history.

(56) References Cited

U.S. PATENT DOCUMENTS 5,587,083 A * 12/1996 Twardowski ........ B01D 61/022
210/651
6,004,464 A * 12/1999 Lien ........................ B01J 49/50
210/639
(Continued)

FOREIGN PATENT DOCUMENTS

WO 96/33005 A1 10/1996
WO 00/03791 A1 1/2000
(Continued)

OTHER PUBLICATIONS

Trisep (Infosheet [online], revised 2017 [retrieved on Jun. 28, 2018. Retrieved from the Internet: <URL: www.trisep.com/s/ACM5. pdf>). (Year: 2017).*
(Continued)

*Primary Examiner* — Ryan B Huang
(74) *Attorney, Agent, or Firm* — Marc Van Dyke; Momentum IP Group

(57) ABSTRACT

A method of selectively separating ions, including: (a) providing a reverse osmosis (RO) separation arrangement having an RO membrane; (b) introducing a feed brine to the RO membrane, the brine containing multivalent cations, alkali cations and halide anions, a total concentration of the alkali cations and halide anions being at least 4%, by weight of the feed brine; (c) applying a sub-osmotic pressure to the feed brine, to drive a first portion of the brine through the RO membrane to produce a permeate solution, a remainder of the feed brine being rejected by the RO membrane and being discharged as a reject solution; the sub-osmotic pressure being applied so as to preferentially distribute the multivalent cations to the reject solution, with respect to the
(Continued)

permeate solution; the sub-osmotic pressure being less than 0.9 times a measured or theoretical osmotic pressure of the feed brine.

19 Claims, 3 Drawing Sheets

(51) Int. Cl.
*B01D 61/02* (2006.01)
*C02F 101/12* (2006.01)
*C02F 103/08* (2006.01)

(52) U.S. Cl.
CPC ...... *B01D 2311/14* (2013.01); *C02F 2101/12* (2013.01); *C02F 2103/08* (2013.01); *C02F 2209/03* (2013.01)

(56) References Cited

U.S. PATENT DOCUMENTS

| | | |
|---|---|---|
| 6,190,556 B1 | 2/2001 | Uhlinger |
| 2009/0215990 A1* | 8/2009 | Cheryan .............. C07K 14/415 530/373 |

FOREIGN PATENT DOCUMENTS

| | | |
|---|---|---|
| WO | 2004/106697 A1 | 12/2004 |
| WO | 2013/023249 A1 | 2/2013 |

OTHER PUBLICATIONS

Hydranautics (Infosheet [online]. Hydranautics, 2001 [retrieved on Jun. 28, 2018]. Retrieved from the Internet: <URL: www.membranes.com/docs/trc/termsequ.pdf>). (Year: 2001).*
Drewes et al. "Can nanofiltration and ultra-low pressure reverse osmosis membranes replace RO for the removal of organic micropollutants, nutrients and bulk organic carbon?" Proceedings of the Water Environment Federation, WEFTEC 2005: Session 81-90, pp. 7428-7440 (Year: 2005).*
Singh, Rajindar. "Chapter 1: Introduction to membrane technology" Hybrid Membrane Systems for Water Purification. 2005. (Year: 2005).*
Tsuru et al., "Reverse osmosis of single and mixed electrolytes with charged membranes: experiment and analysis", Journal of Chemical Engineering of Japan, vol. 24, No. 4, 1991, p. 518-524 (Year: 1991).*
International Search Report for PCT/IB2015/053642 search report dated Aug. 30, 2015.
Written Opinion for PCT/IB2015/053642 written opinion dated Aug. 30, 2015.
Urairi M. et al. 'Bipolar reverse osmosis membrane for separating mono-and divalent ions'. Journal of Membrane Science, Jun. 17, 1992, vol. 70, Issues 2-3, pp. 153-162.
Fritzmann C. et al. 'State-of-the-art of reverse osmosis desalination', Oct. 5, 2007, vol. 216, Issues 1-3, pp. 1-76.
Greenlee L.F. et al. 'Reverse osmosis desalination: Water sources, technology, and today's challenges'. Water Research, May 2009, vol. 43, Issue 9, pp. 2317-2348.

* cited by examiner

SELECTIVE SEPARATION PROCESS

FIELD AND BACKGROUND OF THE INVENTION

The present invention relates to ionic separation processes and, more particularly, to a method of selectively separating ions using a reverse osmosis (RO) membrane operating at a sub-osmotic pressure.

In a conventional RO separation process, a RO membrane is used to separate a feed solution into a permeate, which carries significantly reduced dissolved material (solute), and a reject salt solution which carries away the bulk of the solute. This is achieved by applying a pressure to the feed solution, in excess of the feed solution's osmotic pressure. Such a process yields a reject solution with essentially the same solute constituents as the feed solution. By contrast, in theory, applying less pressure than the feed solution's osmotic pressure would impede permeate generation.

The present inventor has recognized a need for improved methods for separating multivalent positive ions (cations) from solutions where the solute is principally composed of alkali cations and halide anions.

SUMMARY OF THE INVENTION

The inventor has discovered that it is possible to preferentially influence the solute constituents which are separated into a permeate solution by using a reverse osmosis membrane operating at a sub-osmotic pressure.

According to some teachings of the present invention, there is provided a method of selectively separating ions, the method including: (a) providing a reverse osmosis (RO) separation arrangement having an RO membrane, an input of the RO membrane being connected to a feed brine line and outputs of the RO membrane being connected to a permeate solution line and to a salt reject solution line, the RO membrane having a standard salt rejection ratio greater than 90%; (b) introducing a feed brine, via the feed brine line, to the RO membrane, the brine containing multivalent cations, alkali cations and halide anions, a total concentration of the alkali cations and halide anions being at least 4%, by weight of the feed brine; (c) applying a sub-osmotic pressure to the feed brine, to drive a first portion of the brine through the RO membrane to produce a permeate solution in the permeate solution line, a remainder of the feed brine being rejected by the RO membrane and being discharged as a reject solution via the reject solution line; the sub-osmotic pressure being applied so as to preferentially distribute the multivalent cations to the reject solution, with respect to the permeate solution; the sub-osmotic pressure being less than 0.9 times a measured osmotic pressure of the feed brine, the measured osmotic pressure of the feed brine having been measured under actual process conditions.

According to some teachings of the present invention, there is provided a method of selectively separating ions, the method including: (a) providing a reverse osmosis (RO) separation arrangement having an RO membrane, an input of the RO membrane being connected to a feed brine line and outputs of the RO membrane being connected to a permeate solution line and to a salt reject solution line, the RO membrane having a standard salt rejection ratio greater than 90%; (b) introducing a feed brine, via the feed brine line, to the RO membrane, the brine containing multivalent cations, alkali cations and halide anions, a total concentration of the alkali cations and halide anions being at least 4%, by weight of the feed brine; (c) applying a sub-osmotic pressure to the feed brine, to drive a first portion of the brine through the RO membrane to produce a permeate solution in the permeate solution line, a remainder of the feed brine being rejected by the RO membrane and being discharged as a reject solution via the reject solution line; the sub-osmotic pressure being applied so as to preferentially distribute the multivalent cations to the reject solution, with respect to the permeate solution; the sub-osmotic pressure being less than 0.9 times a theoretically determined osmotic pressure of the feed brine, the theoretical osmotic pressure calculated according to:

$$\pi = \frac{-RT\ln(x_s)}{V}$$

wherein:

$\pi$ is the osmotic pressure in bar;
R is the gas constant 0.083145 L·bar/moles·° K;
T is temperature (degrees Kelvin);
V is the molar volume of the solvent; and
$x_s$ is the molar fraction of the solvent.

According to further features in the described preferred embodiments, the standard salt rejection ratio is at least 95%, at least 97%, at least 98%, or at least 98.5%.

According to still further features in the described preferred embodiments, the sub-osmotic pressure is at most 200 bar, at most 180 bar, at most 160 bar, at most 140 bar, at most 130 bar, at most 120 bar, at most 110 bar, at most 100 bar, at most 90 bar, at most 80 bar, or at most 70 bar.

According to still further features in the described preferred embodiments, the sub-osmotic pressure is at least 10 bar, at least 15 bar, at least 20 bar, at least 25 bar, at least 30 bar, at least 35 bar, at least 40 bar, at least 45 bar, or at least 50 bar.

According to still further features in the described preferred embodiments, a first pressure coefficient (Kp) is defined by the sub-osmotic pressure divided by the theoretical osmotic pressure, Kp being at most 0.80, at most 0.60, at most 0.45, at most 0.35, at most 0.30, or at most 0.25.

According to still further features in the described preferred embodiments, the method further includes selecting the sub-osmotic pressure to achieve a separation coefficient ($K_{separation}$) of at least 1.1, the separation coefficient being defined as:

$$K_{separation} = C_{alkali}/C_{multivalent},$$

wherein:

$C_{alkali} = [X_p]_{Mono}/[X_f]_{Mono}$, $[X_p]_{Mono}$ being a total concentration of alkali cations in the permeate solution, and $[X_f]_{Mono}$ being a total concentration of the alkali cations in the feed brine; and $C_{multivalent} = [X_p]_{Multi}/[X_f]_{Multi}$, $[X_p]_{Multi}$ being a total concentration of the multivalent cations in the permeate solution, and $[X_f]_{Multi}$ being a total concentration of the multivalent cations in the feed brine.

According to still further features in the described preferred embodiments, the concentration of the alkali cations within the feed brine is at least 2%, 3%, 5%, 10%, 15%, or 20%, by weight.

According to still further features in the described preferred embodiments, the concentration of the alkali cations within the feed brine is at most 35%, 30%, 25%, 23%, or 21%, by weight.

According to still further features in the described preferred embodiments, the sulfate concentration within the feed brine is within a range of 0%-10%, 0%-8%, 0%-6%, 0%-4%, 0%-3%, 0%-2%, 0.4%-10%, 0.4%-6%, 0.4%-4%, 0.4%-3%, or 0.4%-2%, by weight. In some of these embodiments, the sulfate concentration within the feed brine is at least 0.6%, at least 0.8%, at least 1.0%, at least 1.2%, or at least 1.5%.

According to still further features in the described preferred embodiments, the method includes at least two or at least three sub-osmotic ionic differentiation stages connected in series.

According to still further features in the described preferred embodiments, a combined concentration of calcium ions and magnesium ions within the feed brine is at least 0.05%, at least 0.07%, at least 0.10%, at least 0.15%, at least 0.2%, at least 0.3%, at least 0.5%, at least 1%, at least 2% or at least 5%, by weight.

According to still further features in the described preferred embodiments, a combined concentration of calcium ions and magnesium ions within the feed brine is within a range of 0.05%-20%, 005%-10%, 0.05%-5%, 0.05%-2%, or 0.05%-1.5, by weight.

According to still further features in the described preferred embodiments, the combined concentration is at least 0.07%, at least 0.10%, at least 0.15%, at least 0.2%, at least 0.3%, at least 0.5%, at least 1%, at least 2% at least 3%, or at least 4%, by weight.

According to still further features in the described preferred embodiments, the separation coefficient is at least 1.15, at least 1.2, at least 1.3, at least 1.5, at least 1.7, at least 2.0, at least 3.0, at least 5.0, at least 10, or at least 20.

According to still further features in the described preferred embodiments, a measured pressure coefficient ($K_{pm}$) is defined by the sub-osmotic pressure divided by the measured osmotic pressure of the feed brine, $K_{pm}$ being at most 0.75, at most 0.65, at most 0.55, at most 0.45, at most 0.35, or at most 0.30.

According to still further features in the described preferred embodiments, the alkali cations within the brine include lithium ions in a concentration of at least 150 ppm, at least 200 ppm, at least 300 ppm, at least 400 ppm, or at least 600 ppm, by weight.

According to still further features in the described preferred embodiments, the method further includes collecting the permeate solution.

According to still further features in the described preferred embodiments, the method further includes collecting the salt reject solution.

According to another aspect of the present invention there is provided a method of selectively separating ions, substantially as described herein.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings.

DESCRIPTION OF THE PREFERRED EMBODIMENTS

Figure 1A:
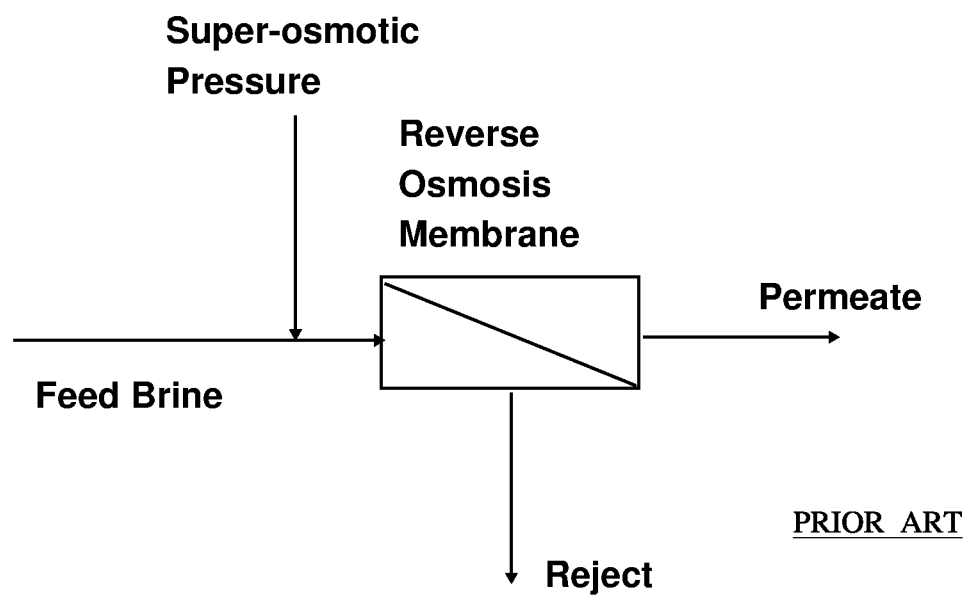
FIG. 1A is a simplified schematic drawing of a reverse osmosis process of the prior art.

The principles and operation of the reverse osmosis ionic separation method according to the present invention may be better understood with reference to the drawings and the accompanying description.

Before explaining at least one embodiment of the invention in detail, it is to be understood that the invention is not limited in its application to the details of construction and the arrangement of the components net forth in the following description or illustrated in the drawings. The invention is capable of other embodiments or of being practiced or carried out in various ways. Also, it is to be understood that the phraseology and terminology employed herein is for the purpose of description and should not be regarded as limiting.

Osmosis occurs when a solvent moves from a region of low solute concentration to a region of high solute concentration. In reverse osmosis, this flow is reversed by applying pressure on the high concentration region, thereby extracting more solvent from the high concentration region. Reverse osmosis separation efficiency may be dependent on solute concentration, pressure, and water flux rate.

Conventional reverse osmosis methodology involves applying a pressure to the feed in excess of the osmotic pressure. Typically, the pressure is well above the osmotic pressure, in order to produce sufficient driving force to the process.

The inventor has surprisingly discovered that an innovative ionic separation method utilizing RO membranes may be achieved by operating at pressures below, and typically significantly below, the osmotic pressure of the feed brine. Moreover, the process is effective using feed brines that typically contain a much higher ionic concentration than those deemed appropriate for conventional RO processes.

The inventive process may utilize any of various commercially available reverse osmosis (RO) membranes. Such semi-permeable membranes are currently commercially available in standard 2.5-16 inch diameter cylindrical canisters of approximately 1 m length. The membrane may be made of polyamide or other materials known and used in the art. The membrane may be spiral wound, allowing the pressurized feed solution to be introduced at one end, while at the other end the permeate exits from a narrow central tube (on the axis of the spiral wound RO membrane), and the reject or concentrate exits in the area between the permeate line and the shell. RO membranes are available from various suppliers including Dow Filmtec™ (Minnesota, USA) and GE Osmonics Desal® (Minnesota, USA). Such membranes can normally support up to at least 80 bar of pressure.

RO membranes may be characterized by a salt rejection ratio. As used herein in the specification and in the claims section that follows, the term "salt rejection ratio" is defined on a percentage basis as:

$$\text{Salt rejection ratio (\%)} = \frac{(\text{Conductivity of feed} - \text{Conductivity of permeate})}{\text{Conductivity of feed}} \times 100 \tag{E1}$$

As used herein in the specification and in the claims section that follows, the term "standard salt rejection ratio" is the salt rejection ratio for a membrane having a feed solution consisting of 2000 ppm sodium chloride in distilled water, at an applied pressure of 15.51 bar (225.0 psi) at a temperature of 25° C. and a pH of 8.0, over 30 minutes of operation, and assuming a 15% clean permeate recovery.

It will be appreciated by those of ordinary skill in the art that such a procedure is a well-known procedure for characterizing membranes, and reverse osmosis membranes in particular.

Generally, a reverse osmosis membrane will exhibit a standard salt rejection ratio of at least 90%, and more typically, at least 95%. Many RO membranes exhibit a standard salt rejection ratio of 98.5 to 99.5%.

Referring now to the drawings, FIG. 1A is a simplified schematic drawing of a reverse osmosis process. A feed brine under pressure is introduced into a semi-permeable filter and some of the feed brine is driven through the membrane as permeate and the remainder exits as a reject effluent. The permeate consists exclusively, or almost exclusively of solvent, in a conventional reverse osmosis process.

Figure 1B:
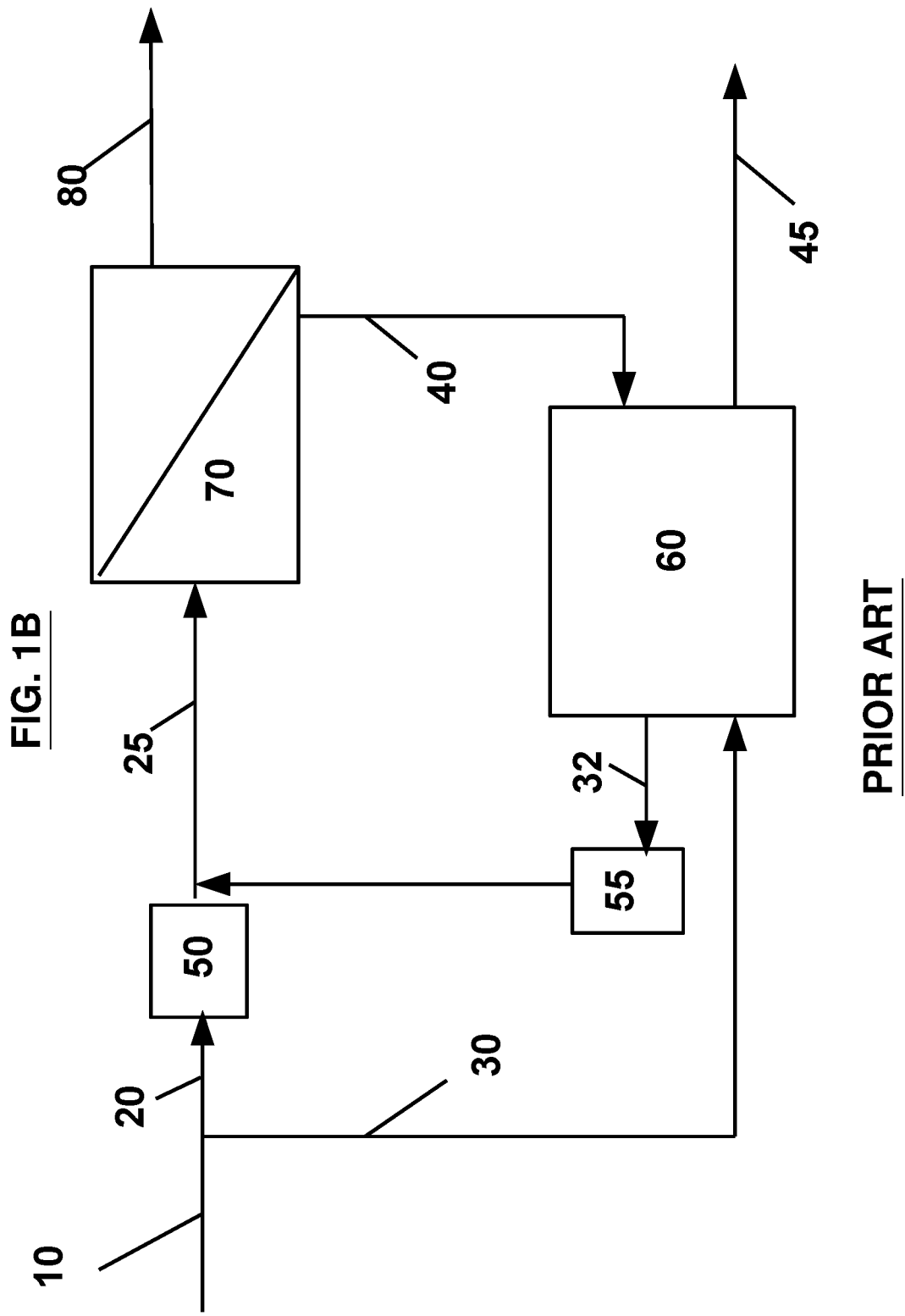
FIG. 1B is a general system diagram showing a reverse osmosis separation system of the prior art.

FIG. 1B is a system process diagram of a prior art reverse osmosis process operated at super-osmotic pressure. Such a process is typically used for purification of feed brines having an ionic concentration up to about 4% by weight. Seawater is one of the most concentrated of such feed brines, containing about 3.5% by weight (or 35 g/L) of dissolved solids.

In FIG. 1B, feed brine 10 is split into two streams, a first stream 20 being routed to a pump 50 and a second stream 30 being routed to a pressure exchanger 60. Within pressure exchanger 60, the high pressure of a reject effluent 40 is used to boost the pressure of second stream 30 to produce a third stream 32 at higher pressure, which stream is routed via to circulation pump 55 to re-combine with first stream 20 downstream of pump 50, to produce a high pressure feed brine 25, at a super-osmotic pressure. High pressure feed brine 25 enters an RO membrane 70, where feed brine 25 is split into a permeate 80 and reject effluent 40. As noted above, reject effluent 40 enters pressure exchanger 60. Having imparted pressure to the feed side, reject effluent 40 is discharged as a low-pressure reject effluent 45.

In such a process, the salt rejection ratio of the RO membrane would typically be greater than 98%, and more typically, at least 99%, in order to achieve significant water purification.

Figure 2:
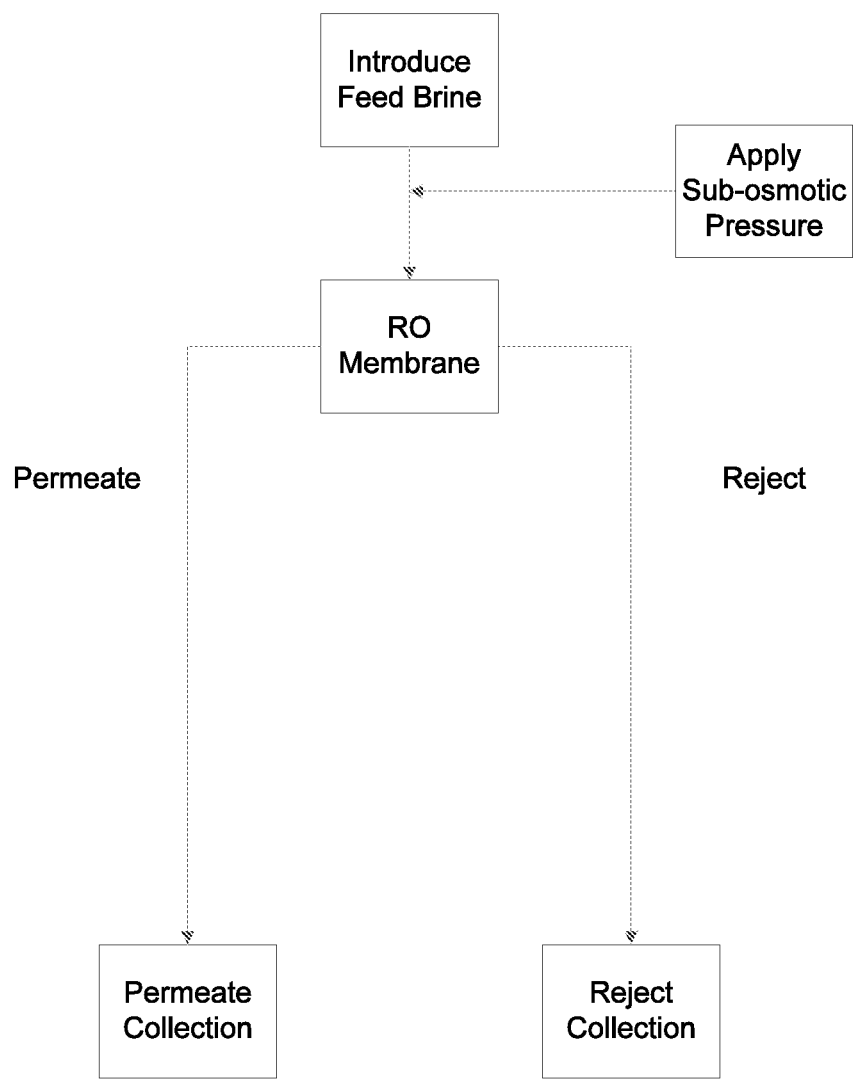
FIG. 2 is a process flow diagram of the ionic differentiation method according to one embodiment of the present invention.

FIG. 2 is a process flow diagram showing one aspect of the ionic separation method according to the present invention. A concentrated feed brine, containing a total concentration of alkali cations and halide anions of at least 4% (by weight of the feed brine) is subjected to a sub-osmotic pressure and then is introduced to a reverse osmosis membrane. Some of the water and some of the solute are driven through the membrane, and are discharged as permeate at the downstream end of the membrane.

A portion of the water and the solute from the feed brine fails to pass through the RO membrane and is discharged as a reject solution. The permeate and reject solutions may be collected and may undergo further processing downstream, according to specific process needs or considerations.

The process of the present invention may be effected in a system such as that described in FIG. 19. However, as noted above, the inventive process must be operated at sub-osmotic pressure.

In the inventive process, the applied pressures are typically less than 60%, less than 45%, less than 35%, less than 30%, or less than 25% of the calculated osmotic pressure of the feed brine. The applied pressures are typically at least 10%, at least 12%, at least 15%, at least 18%, or at least 20%, of this calculated osmotic pressure.

Typically, the total concentration of alkali cations and halide anions in the concentrated feed brine may be at least 5%, at least 6%, at least 7%, at least 8%, at least 10%, at least 12%, at least 14%, at least 16%, at least 18%, or at least 20%, by weight of the feed brine.

It should be noted that in general, lower osmotic pressure facilitates the removal of the alkali earth ions such as calcium and magnesium. In particular, we have found that lower concentrations of alkali cations (e.g., sodium and potassium) and halide anions (e.g., chloride) in the concentrated feed brine may appreciably facilitate the removal of such alkali earth ions.

The inventor further notes that based both on theoretical considerations and preliminary experimental work, the removal of higher multivalent (i.e., having a valence of at least 2 or at least 3) cations is more facile than the removal of divalent cations such as magnesium and calcium, and the ionic differentiation is improved, and typically—appreciably improved. Specific examples of such higher multivalent cations include aluminum and iron (ferric) cations.

Moreover, based both on theoretical considerations and preliminary experimental work, other divalent cations are also differentiated with respect to the monovalent alkali cations, and are suitable for processing using the methods of the present invention. Specific examples of such divalent cations are alkali earth cations such as strontium and barium.

The osmotic pressure may be determined experimentally using various types of osmometers. Some osmometers use either vapor pressure depression or freezing point depression to measure osmotically active compounds. Membrane osmometers, traditionally U-shaped with a semi-permeable membrane at the base, measure the osmotic pressure of a solution separated from a pure solvent by the membrane.

Alternatively, a theoretical osmotic pressure may be calculated according to:

$$\pi = \frac{-RT\ln(\gamma x_s)}{V} \tag{E2}$$

wherein:

$\pi$ is the osmotic pressure in bar;

R is the gas constant 0.083145 L·bar/moles·° K;

T is temperature (degrees Kelvin);

V is the molar volume of the solvent (L/mole);

$\gamma$ is the activity coefficient; and $x_s$ is the molar fraction of the solvent.

The activity coefficient γ is a complex parameter that is highly dependent upon solution constituents and that may be assumed to be at most 1.0 for concentrations and mixtures dominated by NaCl up to 6 mol/L. Solutes other than NaCl may have different variation and, indeed, at very high concentrations, may have γ significantly greater than 1.

For highly concentrated complex solutions, a measured osmotic pressure is preferable.

However, for purposes of the examples provided below, which have a predominant NaCl content, a simplified version of E2, assuming γ=1, may be valid:

$$\pi = \frac{-RT\ln(x_s)}{V} \quad (E3)$$

This equation may be used to demonstrate (e.g., in the examples provided hereinbelow) that the actual applied pressure is much less than the osmotic pressure. Surprisingly, appreciable permeate was generated and ionic differentiation was found to occur.

Online, semi-online, or offline sampling and analysis of the feed brine, permeate solution, and reject solution may be performed. The results may be processed, e.g., by a processor/controller or a technician, to enable monitoring.

In order to evaluate the efficiency of the differentiation of ions, under various conditions, a separation coefficient may be defined as:

$$K_{separation} = C_{alkali}/C_{multivalent}, \quad (E4)$$

wherein:

$$C_{alkali} = [X_p]_{Mono}/[X_f]_{Mono}, \quad (E5)$$

$[X_p]_{Mono}$ being a total concentration of alkali cations in the permeate solution, and $[X_f]_{Mono}$ being a total concentration of the alkali cations in the feed brine; and $$C_{multivalent} = [X_p]_{Multi}/[X_f]_{Multi}, \quad (E6)$$

$[X_p]_{Multi}$ being a total concentration of the multivalent cations in the permeate solution, and $[X_f]_{Multi}$ being a total concentration of the multivalent cations in the feed brine.

According to still further features in the described preferred embodiments, the separation coefficient derived from this method may be at least 1.2, at least 1.3, at least 1.5, at least 1.7, at least 2.0, at least 3.0, at least 5.0, at least 10, or at least 20.

Equations E4 to E6, as presented above, define separation coefficients that can be used to characterize ionic differentiation, the differentiation typically being monovalent cations with respect to multivalent cations.

In fact, equation E4 may be generalized to represent the permeate-to-feed ratio of any constituent that is desirable in the permeate. Equation E5 may similarly be generalized to represent the ratio permeate-to-feed of any constituent that is not desirable in the permeate. Similarly, Equation E6 can be generalized to represent a separation efficiency, comparing the ratio of a desirable permeate constituent to the ratio of an undesirable permeate constituent. Such ratios would appear to be unknown in conventional RO processes, where all solutes within the permeate may be considered undesirable.

According to still further features in the described preferred embodiments, a first pressure coefficient (Kp) may be defined by the applied sub-osmotic pressure divided by the theoretical osmotic pressure, as derived from equation E3 presented above, wherein Kp may be at most 0.80, at most 0.60, at most 0.45, at most 0.35, at most 0.30, or at most 0.25. Kp may be at least 0.10, at least 0.12, at least 0.15, at least 0.18, or at least 0.20.

According to still further features in the described preferred embodiments, a measured pressure coefficient (Kpm) may be defined by the applied sub-osmotic pressure divided by a measured osmotic pressure of the brine, wherein Kpm may be at most 0.9, at most 0.75, at most 0.65, at most 0.55, at most 0.45, at most 0.35, or at most 0.30, and is typically at least 0.10, at least 0.12, at least 0.15, at least 0.18, or at least 0.20.

According to still further features in the described preferred embodiments separation coefficients ($K_{separation(i)}$) may be derived for various specific species such as sodium ions, and potassium ions (both alkali cations) and for multivalent cations. The concentration of the alkali cations within the brine is typically at least 1%, and more typically, at least 2%, at least 4%, at least 6%, at least 8%, at least 10%, or at least 12%, by weight.

EXAMPLES

Reference is now made to the following examples, which, together with the above descriptions, illustrate the invention in a non-limiting fashion.

Example 1

A pilot system similar to the system of FIG. 1 was operated using a Trisep™ ACM (California, USA) RO membrane having a minimum standard salt rejection ratio of 98.5%. A sub-osmotic pressure of 60 atm (60.8 bar) was applied to the feed brine at a temperature of 25° C., the operating pressure being less than 25% of the calculated osmotic pressure of approximately 251 bar.

TABLE 1A

| | Example 1 Feed brine | | | | | | |
|---|---|---|---|---|---|---|---|
| Feed | Na | K | Li | Ca | Mg | B | Cl |
| C (mg/L) | 124000 | 8350 | 640 | 856 | 846 | 406 | 194400 |
| C (wt.-%) | | | | | | | 16% |
| Cl Only | | | | | | | |
| Moles | 5.391 | 0.214 | 0.091 | 0.021 | 0.035 | 0.037 | 5.476 |
| Weight fraction | 0.103333 | 0.006958 | 0.000533 | 0.000713 | 0.000705 | 0.000338 | 0.162 |

From Table 1A, it can be seen that the feed contains in excess of 10% by weight of sodium.

TABLE 1B

Example 1 Osmotic Pressure

| R (version bar) | T (K) | Molar volume H2O (L/mole) | In (molar fraction H2O) | Calculated Osmotic Presure | Total Dissolved solute (mg/L) |
|---|---|---|---|---|---|
| 0.0831 | 298 | 0.020678 | −0.20942 | 250.8048 | 329498 |

Table 1B uses the solute concentrations from Table 1A to calculate the osmotic pressure according to equation E3 as approximately 251 bar. The column headings show the key parameters used in equation E3).

TABLE 1C

Example 1 Permeate

| Permeate | Na | K | Li | Ca | Mg | B | Cl |
|---|---|---|---|---|---|---|---|
| C (mg/L) | 119000 | 7500 | 650 | 127 | 44 | 404 | 181200 |
| C (wt.-%) Cl Only | | | | | | | 15.1% |
| Passed into permeate (%) | 96.0% | 89.8% | 101.6% | 14.8% | 5.2% | 99.5% | 93.2% |

From the representative solute concentrations provided in Table 1A and Table 1C, the concentration of alkali ions in the feed brine is 132,990 mg/L and the concentration of multivalent cations is 1702 mg/L. The boron is neutral (i.e., having a valence of 0). In this test there resulted a concentration of 127,150 mg/L of alkali ions and 171 mg/L multivalent cations in the permeate. Equations E4 to E6 yield the following values for the coefficients.

$C_{alkali}=[X_p]_{Mono}/[X_f]_{Mono}=127{,}150/132{,}990=0.9561$   Using E5, $C_{multivalent}=[X_p]_{Multi}/[X_f]_{Multi}=171/1702=0.1005$   Using E6, $K_{separation}=C_{alkali}/C_{multivalent}=0.9561/0.1005=9.52$   Using E4, In this case, and in Examples 2 and 3 below, small ions such as lithium have passed into the permeate. However, from the Example 1 coefficients calculated above, an ionic differentiation has occurred between the sodium-potassium (alkali) and magnesium-calcium (multi-valent) ions, in a proportion of about 9.5:1. In industrial processes where Mg/Ca must be removed from Na, such differentiation may be useful.

Example 2

The pilot system of Example 1 was operated under identical operating conditions, using a feed brine of the following composition.

From Table 2A, it can be seen that the feed contains in excess of 8% by weight of sodium. In this case, the feed brine also contains over 1% by weight of sulfate.

TABLE 2B

Example 2 Osmotic Pressure

| R (version bar) | T (K) | Molar volume H2O (L/mole) | In (molar fraction H2O) | Calculated Osmotic Presure | Total Dissolved solute (mg/L) |
|---|---|---|---|---|---|
| 0.0831 | 298 | 0.01986 | −0.17513 | 218.3668 | 293665 |

Table 2B uses the solute concentrations from Table 2A to calculate the osmotic pressure according to equation E3 as about 218 bar.

TABLE 2A

Example 2 Feed brine

| Feed | Na | K | Li | Ca | Mg | B | Cl | SO4 |
|---|---|---|---|---|---|---|---|---|
| C (mg/L) | 100000 | 3400 | 377 | 540 | 2500 | 473 | 171600 | 14775 |
| C (wt.-%) Cl Only | | | | | | | 14% | |
| Moles | 4.348 | 0.087 | 0.054 | 0.014 | 0.104 | 0.043 | 4.834 | 0.154 |
| Weight fraction | 0.083333 | 0.002833 | 0.000314 | 0.00045 | 0.002083 | 0.000394 | 0.143 | 0.012313 |

TABLE 2C

| | | | | Example 2 Permeate | | | | |
|---|---|---|---|---|---|---|---|---|
| Permeate | Na | K | Li | Ca | Mg | B | Cl | SO4 |
| C (mg/L) | 82000 | 3000 | 360 | 353 | 1725 | 441 | 153400 | 10425 |
| C (wt.-%) Cl Only | | | | | | | 13.0% | |
| Passed into permeate (%) | 82.0% | 88.2% | 95.5% | 65.4% | 69.0% | 93.2% | 89.4% | 70.6% |

Using Table 2A and Table 2C, it can be seen that the concentration of alkali ions in the feed brine is 103,777 mg/L and the concentration of multivalent cations is 3040 mg/L. In this test there resulted a concentration of 85,360 mg/L of alkali ions and 2078 mg/L multivalent cations in the permeate. Equations E4 to E6 yield the following values for the coefficients:

$C_{alkali}=[X_p]_{Mono}/[X_f]_{Mono}=85,360/103,777=0.8225$     Using E5, $C_{multivalent}=[X_p]_{Multi}/[X_f]_{Multi}=2078/3040=0.6836$     Using E6, $K_{separation}=C_{alkali}/C_{multivalent}=0.8225/0.6836=1.20$     Using E4, Thus, in the process of Example 2, an ionic differentiation has occurred between the sodium-potassium-lithium (alkali) and magnesium-calcium (multi-valent) cations, in a proportion of approximately 1.20:1.

Without wishing to be limited by theory, the inventor believes that this may be due to the concentration level of sulfate ion in the feed brine. This may indicate that pre-processing to remove sulfate from the feed brine may be advantageous prior to applying the ionic differentiation process of the present invention. Such pre-processing may include one or more additional stages of the inventive ionic differentiation process. For example, in a first such stage, the permeate obtained may have a moderately reduced alkali concentration, and a more significantly reduced sulfate concentration. This permeate may then be fed into a second ionic differentiation stage, in which the separation (or differentiation) efficiency is improved due to the lower sulfate concentration, and due to the lower alkali (or overall dissolved solids) concentration.

Example 3

This example uses the same experimental setup and operating conditions as Example 1, but a feed brine of a different composition.

TABLE 3A

| | | | | Example 3 Feed brine | | | | |
|---|---|---|---|---|---|---|---|---|
| Feed | Na | K | Li | Ca | Mg | B | Cl | SO4 |
| C (mg/L) | 126750 | 3690 | 456 | 420 | 690 | 468 | 180000 | 1260 |
| C (wt.-%) Cl Only | | | | | | | 15% | |
| Moles | 5.511 | 0.095 | 0.065 | 0.011 | 0.029 | 0.043 | 5.070 | 0.013 |
| Weight fraction | 0.105625 | 0.003075 | 0.00038 | 0.00035 | 0.000575 | 0.00039 | 0.15 | 0.00105 |

From Table 3A, it can be seen that the feed contains about 10.5% by weight of sodium.

TABLE 3B

| | | | | | |
|---|---|---|---|---|---|
| | | | Example 3 Osmotic Pressure | | |
| R (version bar) | T (K) | Molar volume H2O (L/mole) | In (molar fraction H2O) | Calculated Osmotic Presure | Total Dissolved solute (mg/L) |
| 0.0831 | 298 | 0.02031 | −0.19891 | 242.5357 | 313734 |

Table 3B uses the solute concentrations from Table 3A to calculate the osmotic pressure according to equation E3 as about 242 bar.

TABLE 3C

Example 3 Permeate

| Permeate | Na | K | Li | Ca | Mg | B | Cl | SO4 |
|---|---|---|---|---|---|---|---|---|
| C (mg/L) | 113250 | 3260 | 440 | 128 | 160 | 483 | 161660 | 180 |
| C (wt.-%) Cl Only | | | | | | | 13.7% | |
| Passed into permeate (%) | 89.3% | 88.3% | 96.5% | 30.5% | 23.2% | 103.2% | 89.8% | 14.3% |

Using Table 3A and Table 3C, it can be seen that the concentration of alkali ions in the feed brine is 130,896 mg/L and the concentration of multivalent ions is 1110 mg/L. In this test there resulted a concentration of 116,950 mg/L of alkali ions and 288 mg/L multivalent ions in the permeate. Equations E4 to E6 yield the following values for the coefficients.

$C_{alkali} = [X_p]_{Mono}/[X_f]_{Mono} = 116{,}950/130{,}896 = 0.8935$  Using E5, $C_{multivalent} = [X_p]_{Multi}/[X_f]_{Multi} = 288/1110 = 0.2595$  Using E6, $K_{separation} = C_{alkali}/C_{multivalent} = 0.8935/0.2595 = 3.44$  Using E4, Thus, in the process of Example 3, an ionic differentiation has occurred between the sodium-potassium-lithium (alkali) and magnesium-calcium (multi-valent) cations, in a proportion of approximately 3.4:1.

Example 4

This example uses the same experimental setup and operating conditions as Example 1. The composition of the feed brine, and the composition of the permeate produced are provided in Table 4.

TABLE 4A

Example 4 Feed brine

| Feed | Na | K | Li | Ca | Mg | B | Cl | SO4 |
|---|---|---|---|---|---|---|---|---|
| C (mg/L) | 40000 | 3700 | 270 | 840 | 500 | 25 | 63000 | 4780 |
| C (wt.-%) Cl Only | | | | | | | 6% | |
| Moles | 1.739 | 0.095 | 0.039 | 0.021 | 0.021 | 0.002 | 1.775 | 0.050 |
| Weight fraction | 0.037383 | 0.003458 | 0.000252 | 0.000785 | 0.0004673 | 2.34E-05 | 0.058879 | 0.004467 |

From Table 4A, it can be seen that the feed contains in excess of 3.5% by weight of sodium.

TABLE 4B

Example 4 Osmotic Pressure

| R (version bar) | T (K) | Molar volume H2O (L/mole) | In (molar fraction H2O) | Calculated Osmotic Presure | Total Dissolved solute (mg/L) |
|---|---|---|---|---|---|
| 0.0831 | 298 | 0.018811 | -0.06801 | 89.529737 | 113115 |

Table 4B uses the solute concentrations from Table 4A to calculate the osmotic pressure according to equation E3 as about 89.5 bar.

TABLE 4C

Example 4 Permeate

| Permeate | Na | K | Li | Ca | Mg | B | Cl | SO4 |
|---|---|---|---|---|---|---|---|---|
| C (mg/L) | 26500 | 2400 | 200 | 80 | 30 | 25 | 45000 | 105 |
| C (wt.-%) Cl Only | | | | | | | 4.3% | |
| Passed into permeate (%) | 66.3% | 64.9% | 74.1% | 9.5% | 6.0% | 100.0% | 71.4% | 2.2% |

Using Table 4A and Table 4C, it can be seen that the concentration of alkali ions in the feed brine is 43,970 mg/L and the concentration of multivalent ions is 1340 mg/L. In this test there resulted a concentration of 29,100 mg/L of alkali ions and 110 mg/L multivalent ions in the permeate. Equations E4 to E6 yield the following values for the coefficients.

$$C_{alkali} = [X_p]_{Mono}/[X_f]_{Mono} = 29,100/43,970 = 0.6618 \quad \text{Using E5,}$$

$$C_{multivalent} = [X_p]_{Multi}/[X_f]_{Multi} = 110/1340 = 0.0821 \quad \text{Using E6,}$$

$$K_{separation} = C_{alkali}/C_{multivalent} = 0.6618/0.0821 = 8.06 \quad \text{Using E4,}$$

Thus, in the process of Example 4, an ionic differentiation has occurred between the sodium-potassium-lithium (alkali) and magnesium-calcium (multi-valent) cations, in a proportion of approximately 8.1:1.

As used herein in the specification and in the claims section that follows, the term "percent", or "%", refers to percent by weight, unless specifically indicated otherwise.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method of selectively separating multivalent ions from monovalent ions, the method comprising:
   (a) providing a reverse osmosis (RO) separation arrangement having an RO membrane, an input of said RO membrane being connected to a feed brine line and outputs of said RO membrane being connected to a permeate solution line and to a salt reject solution line, said RO membrane having a standard salt rejection ratio greater than 90%;
   (b) introducing a feed brine, via said feed brine line, to said RO membrane, said feed brine containing multivalent cations, alkali cations and halide anions, a total concentration of said alkali cations and halide anions being at least 4%, by weight of said feed brine;
   (c) applying a sub-osmotic pressure to said feed brine, to drive a first portion of said feed brine through said RO membrane to produce a permeate solution in said permeate solution line, a remainder of said feed brine being rejected by said RO membrane and being discharged as a reject solution via said salt reject solution line;
   said sub-osmotic pressure being applied so as to differentiatively distribute said multivalent cations to said reject solution, with respect to said permeate solution;
   said sub-osmotic pressure being less than 0.9 times a measured osmotic pressure of said feed brine, said measured osmotic pressure of said feed brine having been measured under actual process conditions;
   wherein said sub-osmotic pressure is selected to achieve a separation coefficient ($K_{separation}$) of at least 1.1, said separation coefficient being defined as:

$$K_{separation} = C_{alkali}/C_{multivalent},$$

wherein:
$C_{alkali} = [X_p]_{Mono}/[X_f]_{Mono}$, $[X_p]_{Mono}$ being a total concentration of alkali cations in said permeate solution, and $[X_f]_{Mono}$ being a total concentration of said alkali cations in said feed brine; and
$C_{multivalent} = [X_p]_{Multi}/[X_f]_{Multi}$, $[X_p]_{Multi}$ being a total concentration of said multivalent cations in said permeate solution, and $[X_f]_{Multi}$ being a total concentration of said multivalent cations in said feed brine.

2. The method of claim 1, said standard salt rejection ratio being at least 98%.

3. The method of claim 1, said sub-osmotic pressure being at most 200 bar, said sub-osmotic pressure being less than 0.9 times a theoretical osmotic pressure calculated according to:

$$\pi = \frac{-RT\ln(x_s)}{V}$$

wherein:
$\pi$ is the osmotic pressure in bar;
R is the gas constant 0.083145 L·bar/moles·® K;
T is temperature (degrees Kelvin);
V is the molar volume of the solvent;
$x_s$ is the molar fraction of the solvent.

4. The method of claim 3, wherein a first pressure coefficient (Kp) is defined by said sub-osmotic pressure divided by said theoretical osmotic pressure, and wherein Kp is at most 0.60.

5. The method of claim 1, wherein a concentration of said alkali cations within said feed brine is at least 5%, by weight.

6. The method of claim 1, wherein a combined concentration of calcium ions and magnesium ions within said feed brine is at least 0.05%, by weight.

7. The method of claim 1, wherein a combined concentration of calcium ions and magnesium ions within said feed brine is within a range of 0.05%-20%, by weight.

8. The method of claim 7, wherein said combined concentration of calcium ions and magnesium ions within said feed brine is at least 0.2%, by weight.

9. The method of claim 1, wherein a measured pressure coefficient (Kpm) is defined by said sub-osmotic pressure divided by said measured osmotic pressure of said feed brine, and wherein Kpm is at most 0.75.

10. The method of claim 1, wherein said alkali cations within said feed brine include lithium ions in a concentration of at least 150 ppm.

11. The method of claim 1, further comprising collecting said permeate solution.

12. The method of claim 1, wherein said sub-osmotic pressure is at least 10 bar and at most 200 bar.

13. The method of claim 1, wherein a sulfate concentration within said feed brine is within a range of 0.4% to 10%, by weight.

14. The method of claim 1, wherein said alkali cations within said feed brine include lithium ions in a concentration of at least 300 ppm.

15. The method of claim 1, wherein a combined concentration of calcium ions and magnesium ions within said feed brine is within a range of 0.05%-5%, by weight, and wherein said alkali cations within said feed brine include lithium ions in a concentration of at least 150 ppm.

16. A method of selectively separating ions, the method comprising:

(a) providing a reverse osmosis (RO) separation arrangement having an RO membrane, an input of said RO membrane being connected to a feed brine line and outputs of said RO membrane being connected to a permeate solution line and to a salt reject solution line, said RO membrane having a standard salt rejection ratio greater than 90%;

(b) introducing a feed brine, via said feed brine line, to said RO membrane, said feed brine containing multivalent cations, alkali cations and halide anions, a total concentration of said alkali cations and halide anions being at least 8%, by weight of said feed brine;

(c) applying a sub-osmotic pressure to said feed brine, to drive a first portion of said feed brine through said RO membrane to produce a permeate solution in said permeate solution line, a remainder of said feed brine being rejected by said RO membrane and being discharged as a reject solution via said salt reject solution line;

said sub-osmotic pressure being applied so as to differentiatively distribute said multivalent cations to said reject solution, with respect to said permeate solution;

said sub-osmotic pressure being less than 0.9 times a measured osmotic pressure of said feed brine, said measured osmotic pressure of said feed brine having been measured under actual process conditions;

wherein said sub-osmotic pressure is at least 10 bar and at most 200 bar;

and wherein a combined concentration of calcium ions and magnesium ions within said feed brine is at least 0.05%, by weight;

wherein said sub-osmotic pressure is selected to achieve a separation coefficient ($K_{separation}$) of at least 1.1, said separation coefficient being defined as:

$$K_{separation} = C_{alkali}/C_{multivalent},$$

wherein:

$C_{alkali} = [X_p]_{Mono}/[X_f]_{Mono}$, $[X_p]_{Mono}$ being a total concentration of alkali cations in said permeate solution, and $[X_f]_{Mono}$ being a total concentration of said alkali cations in said feed brine; and $C_{multivalent} = [X_p]_{Multi}/[X_f]_{Multi}$, $[X_p]_{Multi}$ being a total concentration of said multivalent cations in said permeate solution, and $[X_f]_{Multi}$ being a total concentration of said multivalent cations in said feed brine.

17. The method of claim 16, wherein said total concentration of said alkali cations and halide anions is at least 12%, by weight of said feed brine.

18. The method of claim 16, wherein said combined concentration of calcium ions and magnesium ions within said feed brine is within a range of 0.20%-20%, by weight.

19. The method of claim 16, wherein said combined concentration of calcium ions and magnesium ions within said feed brine is within a range of 0.05%-2%, by weight.

* * * * *